United States Patent
Li et al.

(10) Patent No.: US 9,042,058 B1
(45) Date of Patent: May 26, 2015

(54) SHIELD DESIGNED FOR MIDDLE SHIELDS IN A MULTIPLE SENSOR ARRAY

(71) Applicant: Western Digital Technologies, Inc., Irvine, CA (US)

(72) Inventors: Shaoping Li, San Ramon, CA (US); Gerardo A. Bertero, Redwood City, CA (US); Michael L. Mallary, Sterling, MA (US); Guanxiong Li, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/097,157

(22) Filed: Dec. 4, 2013

Related U.S. Application Data

(60) Provisional application No. 61/892,336, filed on Oct. 17, 2013.

(51) Int. Cl.
| | | |
|---|---|---|
| G11B 5/39 | (2006.01) | |
| G11B 5/60 | (2006.01) | |
| G11B 5/29 | (2006.01) | |

(52) U.S. Cl.
CPC ............ G11B 5/3912 (2013.01); G11B 5/3932 (2013.01); G11B 5/3961 (2013.01); G11B 5/6005 (2013.01); G11B 5/397 (2013.01); G11B 5/3951 (2013.01)

(58) Field of Classification Search
CPC ...... G11B 5/4886; G11B 5/4976; G11B 5/29; G11B 5/3977; G11B 5/397; G11B 5/596; G11B 5/295; G11B 5/3951; G11B 5/3954; G11B 5/115; G11B 5/3932; G11B 5/3961; G11B 5/6005; G11B 5/3912

USPC .......................................................... 360/316
See application file for complete search history.

(56) References Cited

U.S. PATENT DOCUMENTS

| | | | |
|---|---|---|---|
| 3,780,266 | A | 12/1973 | Mudsam et al. |
| 4,012,781 | A | 3/1977 | Lin |
| 4,597,023 | A | 6/1986 | Rijckaert |
| 5,229,901 | A | 7/1993 | Mallary |
| 5,270,892 | A | 12/1993 | Naberhuis |
| 5,309,305 | A | 5/1994 | Nepela et al. |
| 5,321,557 | A | 6/1994 | Shimotashiro et al. |
| 5,353,176 | A | 10/1994 | Kosuge |
| 5,388,014 | A | 2/1995 | Brug et al. |

(Continued)

OTHER PUBLICATIONS

Shaoping Li, et al., U.S. Appl. No. 13/928,799, filed Jun. 27, 2013, 27 pages.

(Continued)

Primary Examiner — Will J Klimowicz

(57) ABSTRACT

A method and system provide a magnetic transducer having an air-bearing surface (ABS). The method provides a first read sensor stack and defines a first read sensor in a stripe height direction from the first read sensor stack. The stripe height direction is perpendicular to the ABS. A shield is provided on the first read sensor stack and in a down track direction from the first read sensor stack. A second read sensor stack is provided. The shield is between the first read sensor and the second read sensor stack in the down track direction. Both the first read sensor and the second read sensor are defined from the first read sensor stack and from the second read sensor stack, respectively, in a cross-track direction. The cross-track direction is substantially perpendicular to the down track direction and substantially perpendicular to the stripe height direction.

19 Claims, 15 Drawing Sheets

(56) References Cited

U.S. PATENT DOCUMENTS

| | | |
|---|---|---|
| 5,508,868 A | 4/1996 | Cheng et al. |
| 5,523,904 A | 6/1996 | Saliba |
| 5,684,658 A | 11/1997 | Shi et al. |
| 5,696,654 A | 12/1997 | Gill et al. |
| 5,721,008 A | 2/1998 | Huang et al. |
| 5,796,535 A | 8/1998 | Tuttle et al. |
| 5,831,888 A | 11/1998 | Glover |
| 5,963,400 A | 10/1999 | Cates et al. |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,071,007 A | 6/2000 | Schaenzer et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,104,562 A | 8/2000 | Ottesen et al. |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,154,335 A | 11/2000 | Smith et al. |
| 6,157,510 A | 12/2000 | Schreck et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,191,925 B1 | 2/2001 | Watson |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,216,242 B1 | 4/2001 | Schaenzer |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,271,998 B1 | 8/2001 | Coehoorn et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,311,551 B1 | 11/2001 | Boutaghou |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,341,102 B1 | 1/2002 | Sato et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,982 B2 | 4/2002 | Saliba |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,449,131 B2 | 9/2002 | Guo et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,541 B1 | 10/2002 | Wang et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |

(56) References Cited

U.S. PATENT DOCUMENTS

| | | |
|---|---|---|
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,333 B1 | 12/2002 | Han et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,674,618 B2 | 1/2004 | Engel et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Chen et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Spallas et al. |
| 6,834,010 B1 | 12/2004 | Qi et al. |
| 6,842,312 B1 | 1/2005 | Alstrin et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,921,592 B2 * | 7/2005 | Tani et al. ............ 428/845.5 |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,247 B2 | 9/2005 | Schwarz et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 6,995,957 B2 | 2/2006 | Jayasekara |
| 7,002,777 B2 | 2/2006 | Ogawa et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,106,549 B2 | 9/2006 | Asakura |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,807 B1 | 3/2007 | Liikanen et al. |
| 7,193,815 B1 | 3/2007 | Stoev et al. |
| 7,196,880 B1 | 3/2007 | Anderson et al. |

(56) References Cited

U.S. PATENT DOCUMENTS

| | | | |
|---|---|---|---|
| 7,199,974 B1 | 4/2007 | Alfoqaha |
| 7,199,975 B1 | 4/2007 | Pan |
| 7,211,339 B1 | 5/2007 | Seagle et |
| 7,212,384 B1 | 5/2007 | Stoev et al. |
| 7,215,514 B1 | 5/2007 | Yang et al. |
| 7,238,292 B1 | 7/2007 | He et al. |
| 7,239,465 B1 | 7/2007 | Watson et al. |
| 7,239,478 B1 | 7/2007 | Sin et al. |
| 7,242,547 B2 | 7/2007 | Ogawa |
| 7,248,431 B1 | 7/2007 | Liu et al. |
| 7,248,433 B1 | 7/2007 | Stoev et al. |
| 7,248,449 B1 | 7/2007 | Seagle |
| 7,259,927 B2 | 8/2007 | Harris |
| 7,271,970 B2 | 9/2007 | Tsuchiya |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,324,303 B2 * | 1/2008 | Ozue et al. ............ 360/121 |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,382,585 B1 * | 6/2008 | Nibarger et al. ............ 360/316 |
| 7,386,933 B1 | 6/2008 | Krounbi et al. |
| 7,389,577 B1 | 6/2008 | Shang et al. |
| 7,405,907 B2 | 7/2008 | Raastad |
| 7,408,730 B2 | 8/2008 | Yamagishi |
| 7,417,832 B1 | 8/2008 | Erickson et al. |
| 7,419,891 B1 | 9/2008 | Chen et al. |
| 7,420,758 B2 | 9/2008 | Inoue et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,632 B2 | 10/2008 | Li et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,453,671 B1 * | 11/2008 | Nibarger et al. ............ 360/316 |
| 7,493,688 B1 | 2/2009 | Wang et al. |
| 7,502,193 B2 | 3/2009 | Albrecht et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,393 B2 * | 6/2009 | Biskeborn et al. ............ 360/121 |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,619,194 B2 | 11/2009 | Kobashi |
| 7,639,457 B1 | 12/2009 | Chen et al. |
| 7,652,847 B2 | 1/2010 | Weiss et al. |
| 7,656,610 B1 * | 2/2010 | Campos et al. ............ 360/121 |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,751,148 B1 * | 7/2010 | Alstrin et al. ............ 360/241.1 |
| 7,755,863 B2 | 7/2010 | Neumann et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,009,388 B2 | 8/2011 | Oh et al. |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,139,301 B1 | 3/2012 | Li et al. |
| 8,141,235 B1 | 3/2012 | Zhang |
| 8,144,424 B2 | 3/2012 | Dugas et al. |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,228 B2 | 6/2012 | Maat et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |

(56) References Cited

U.S. PATENT DOCUMENTS

| | | |
|---|---|---|
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,508 B1 | 12/2013 | Burd |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |

(56) References Cited

U.S. PATENT DOCUMENTS

| | | |
|---|---|---|
| 8,705,205 B1 | 4/2014 | Li et al. |
| 8,711,517 B2 * | 4/2014 | Erden et al. .................. 360/121 |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,786,987 B2 * | 7/2014 | Edelman et al. ......... 360/324.12 |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2003/0151855 A1 * | 8/2003 | Molstad et al. ............... 360/316 |
| 2004/0184181 A1 | 9/2004 | Fukuda et al. |
| 2005/0036241 A1 | 2/2005 | Tsuda et al. |
| 2005/0036437 A1 | 2/2005 | Learned et al. |
| 2007/0242378 A1 | 10/2007 | Ikegami et al. |
| 2008/0203279 A1 | 8/2008 | Kobashi |
| 2010/0020435 A1 | 1/2010 | Chen et al. |
| 2010/0290157 A1 | 11/2010 | Zhang et al. |
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0282492 A1 | 11/2012 | Sasaki et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2013/0286502 A1 * | 10/2013 | Erden et al. ..................... 360/76 |
| 2014/0154529 A1 | 6/2014 | Yang et al. |
| 2014/0160590 A1 | 6/2014 | Sankaranarayanan et al. |
| 2014/0175050 A1 | 6/2014 | Zhang et al. |

OTHER PUBLICATIONS

Donald Brunnett, et al., U.S. Appl. No. 14/203,358, filed Mar. 10, 2014, 11 pages.

* cited by examiner

300

| Cap/Top Electrode | 308 |
| Free/Sensor Layer | 325 |
| Tunneling Barrier Layer | 320 |
| Second Ferromagnetic Layer | 316 |
| Nonmagnetic Spacer Layer | 314 |
| First Ferromagnetic Layer | 312 |
| Pinning Layer | 306 |
| Seed/Bottom Electrode | 304 |
| First Read Shield | 302 |

330 → (pointing to layers 312–316 as 310)

ABS View
FIG. 7

300

| Mask | 326 |
| Cap/Top Electrode | 308' |
| Free/Sensor Layer | 325' |
| Tunnel. Barrier Layer | 320' |
| Second Ferro. Layer | 316' |
| NM Spacer Layer | 314' |
| First Ferro. Layer | 312' |
| Pinning Layer | 306' |
| Seed/Bottom Elec. | 304' |
| First Read Shield | 302 |

330' → (pointing to layers 312'–316' as 310')

Side View
FIG. 8

Side View

Side View

300

| Cap Layer | 358 |
|---|---|
| Free/Sensor Layer | 375 |
| Tunneling Barrier Layer | 370 |
| Second Ferromagnetic Layer | 366 |
| Nonmagnetic Spacer Layer | 364 |
| First Ferromagnetic Layer | 362 |
| Pinning Layer | 356 |
| Seed/Bottom Electrode | 354 |
| Shield Layer | 346 |
| Insulating Layer | 344 |
| Shield Layer | 342 |
| Cap/Top Electrode | 308' |
| Free/Sensor Layer | 325' |
| Tunneling Barrier Layer | 320' |
| Second Ferromagnetic Layer | 316' |
| Nonmagneitc Spacer Layer | 314' |
| First Ferromagnetic Layer | 312' |
| Pinning Layer | 306' |
| Seed/Bottom Electrode | 304' |
| First Read Shield | 302 |

350 → (layers 362–375 with 360 bracket for 362–366)

340 → (shield/insulator region)

330' → (layers 312'–325' with 310' bracket for 312'–316')

ABS View
FIG. 11

ABS View

ABS View

ABS View

ABS View

Side View

Side View

US 9,042,058 B1

SHIELD DESIGNED FOR MIDDLE SHIELDS IN A MULTIPLE SENSOR ARRAY

CROSS-REFERENCE TO RELATED APPLICATIONS

This application claims priority to provisional U.S. Patent Application Ser. No. 61/892,336, filed on Oct. 17, 2013, which is hereby incorporated by reference in its entirety.

BACKGROUND

FIG. 1 depicts an air-bearing surface (ABS) view of a conventional read transducer 10. The conventional read transducer 10 includes shields 12 and 20, sensor 14 and magnetic bias structures 16. The read sensor 14 is typically a giant magnetoresistive (GMR) sensor or tunneling magnetoresistive (TMR) sensor. The read sensor 14 includes an antiferromagnetic (AFM) layer, a pinned layer, a nonmagnetic spacer layer, and a free layer. Also shown is a capping layer. In addition, seed layer(s) may be used. The free layer has a magnetization sensitive to an external magnetic field. Thus, the free layer functions as a sensor layer for the magnetoresistive sensor 14. The magnetic bias structures 16 may be hard bias structures or soft bias structures. These magnetic bias structures are used to magnetically bias the sensor layer of the sensor 14.

Although the conventional magnetic recording transducer 10 functions, there are drawbacks. In particular, the conventional magnetic recording transducer 10 may not function adequately at higher recording densities. Two-dimensional magnetic recording (TDMR) technology may enable significantly higher recording densities. In TDMR, multiple read sensors are used. These sensors are longitudinally distributed along the cross track direction and are desired to be aligned in the down track direction. The central sensor reads the data from a track of interest, while the outer sensors sense the data in adjacent tracks in order to account for noise.

Although TDMR might be capable of higher recording densities, issues may be faced at skew. For example, in recording applications the skew angle generally changes. Near the outside diameter of the disk, the skew angle may be positive. Closer to the center of the disk (the inside diameter of the disk), the skew angle may be negative. Between the inside and outside diameters, the skew angle may be zero. For nonzero skew angle(s), some of the recording sensors may be moved so that they are misaligned with the track they are desired to sense. This is generally an issue for the outer read sensors. As a result, the transducer may not perform as desired for all skew angles. In addition, fabrication of the sensors may be challenging. Accordingly, what is needed is a system and method for improving the performance of a magnetic recording read transducer, particular for TDMR.

BRIEF DESCRIPTION OF SEVERAL VIEWS OF THE DRAWINGS

FIGS. 7-18 depict another exemplary embodiment of a portion of a magnetic recording read transducer and disk drive during fabrication.

DETAILED DESCRIPTION OF THE EXEMPLARY EMBODIMENTS

Figure 1:
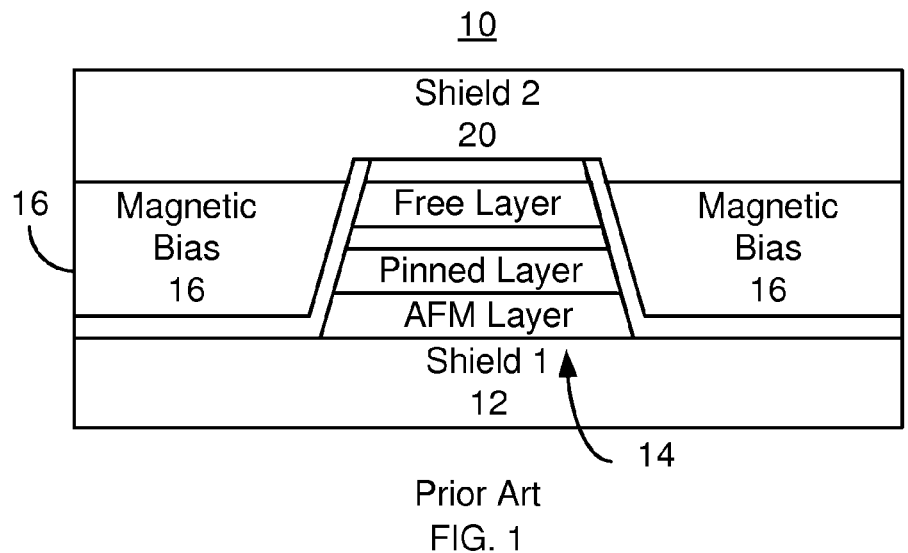
FIG. 1 depicts a conventional read transducer.
Figure 2:
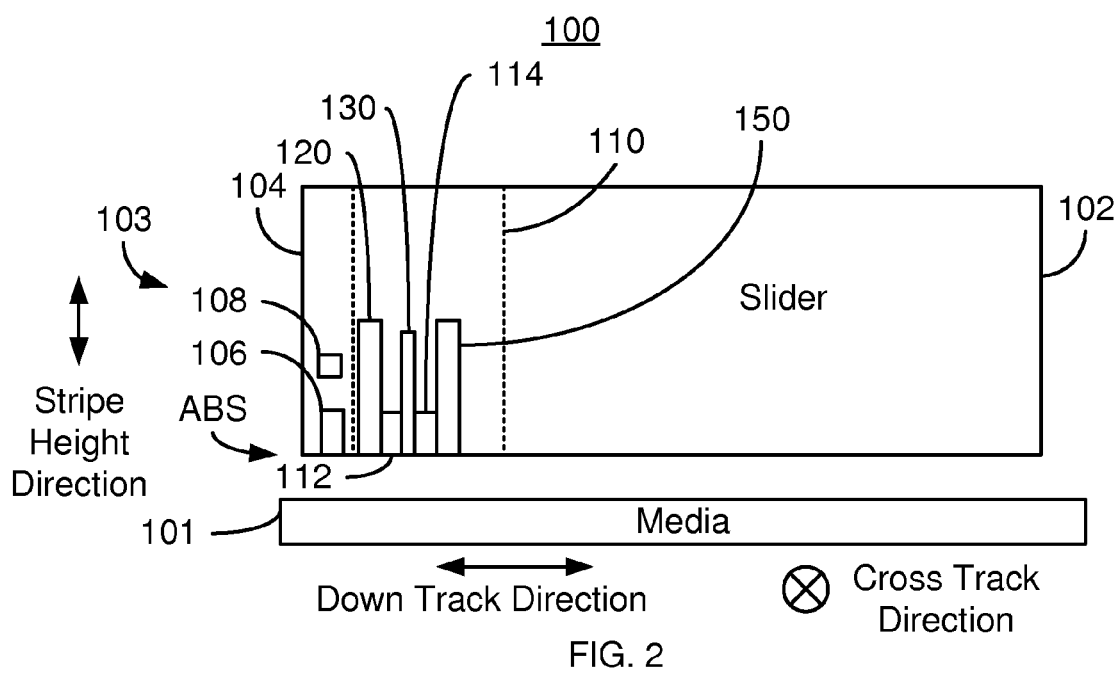
FIG. 2 depicts an exemplary embodiment of a disk drive.

FIG. 2 depicts a side view of a disk drive 100. For clarity, FIG. 2 is not to scale. For simplicity not all portions of the disk drive 100 are shown. In addition, although the disk drive 100 is depicted in the context of particular components other and/or different components may be used. For example, circuitry used to drive and control various portions of the disk drive 100 is not shown. For simplicity, only single components are shown. However, multiples of one or more of the components and/or their sub-components might be used.

The disk drive 100 includes media 101, a slider 102, a head 103 including a write transducer 104 and a read transducer 110. The write transducer includes at least a write pole 106 and coil(s) 108 for energizing the pole 106. Additional and/or different components may be included in the disk drive 100. Although not shown, the slider 102, and thus the transducers 104 and 110 are generally attached to a suspension (not shown). The transducers 104 and 110 are fabricated on the slider 102 and include an ABS proximate to the media 101 during use. Although both a write transducer 104 and a read transducer 110 are shown, in other embodiments, only a read transducer 110 may be present. The read transducer 110 includes multiple read sensors 112 and 114. In the embodiment shown, the read sensor 112 and 114 are self-aligned in the down track direction of the transducer 110.

Figure 3A:
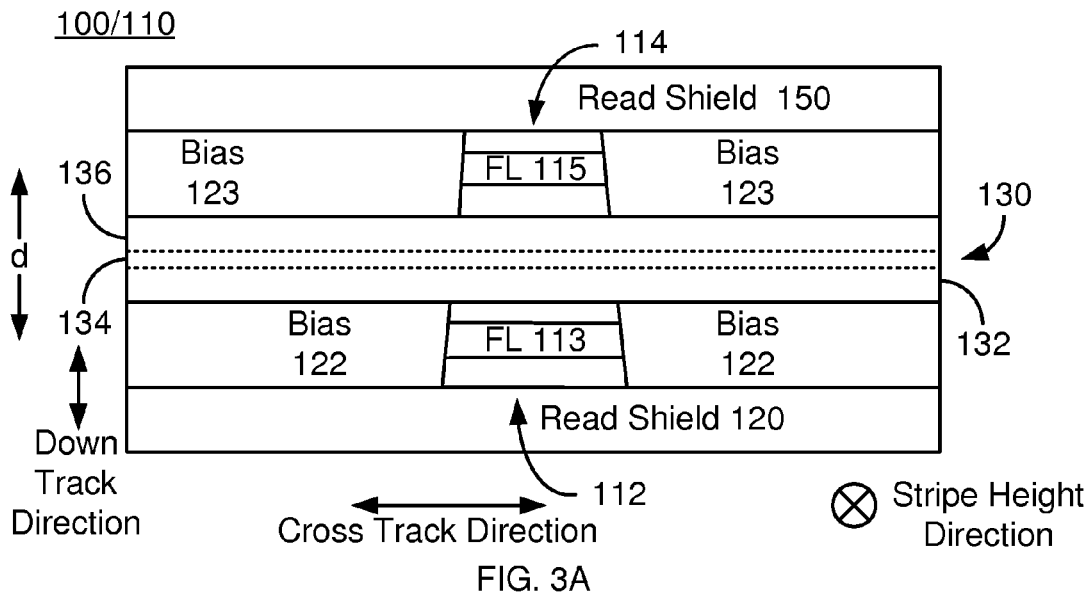
FIGS. 3A-3B depict an ABS view exemplary embodiment of a portion of a magnetic recording read transducer and the exemplary embodiment of the magnetic recording read transducer at a skew angle.
Figure 3B:
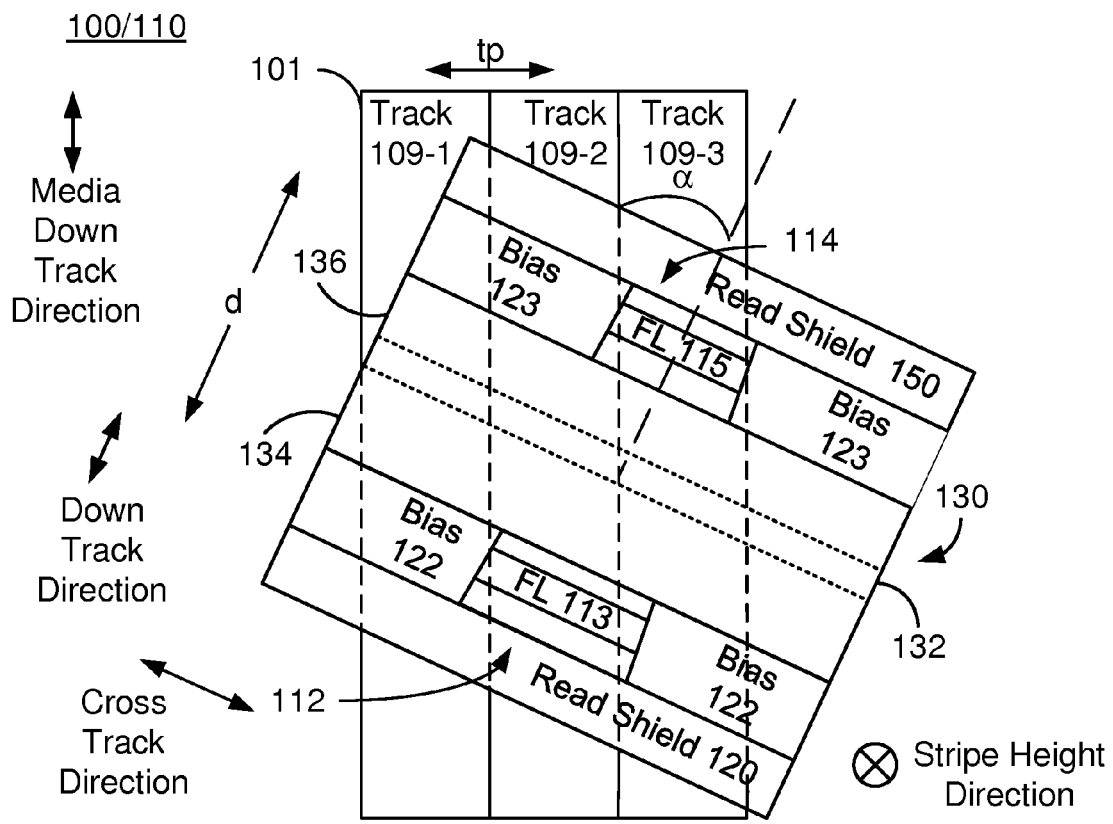

FIGS. 3A and 3B depict an ABS view of the transducer 110 of the disk drive 100 and a view of the transducer 110 with respect to the media 101 and as attached to the suspension (not shown). For clarity, FIGS. 3A and 3B are not to scale. For simplicity not all portions of the disk drive 100 are shown. The transducer 110 and disk drive 100 depicted in FIGS. 3A and 3B are analogous to the read transducer 110 and disk drive 100 depicted in FIG. 2. Consequently, analogous components have similar labels. For simplicity, only a portion of the transducer 110 and disk drive 100 are shown in FIGS. 3A-3B.

Referring to FIGS. 2, 3A and 3B, the read transducer 110 includes multiple read sensors 112 and 114 having sensor layers 113 and 115, respectively, that may be free layers in a GMR sensor or a TMR sensor. The sensor layers 113 and 115 may be free layers in a magnetoresistive junction such as a giant magnetoresistive (GMR) sensor, a tunneling magnetoresistive (TMR) sensor. Thus, each sensor 112 and 114 may include a pinning layer, a pinned layer, a nonmagnetic spacer layer and a free layer 113 and 115, respectively. For simplicity, only the free layers 113 and 115 are separately labeled in FIGS. 3A-3B. The sensors 112 and 114 may also include seed layer(s) (not shown) and capping layer(s) (not shown). The pinning layer is generally an AFM layer that is magnetically coupled to the pinned layer. In other embodiments, however, the pinning layer may be omitted or may use a different pinning mechanism. The free layers 113 and 115 are each shown as a single layer, but may include multiple layers including but not limited to a synthetic antiferromagnetic (SAF) structure. The pinned layer may also be a simple layer or a multilayer. Although shown as extending the same distance from the ABS in FIG. 2, the pinned layer may extend further than the corresponding free layer 113 and/or 115. The nonmagnetic spacer layer may be a conductive layer, a tunneling barrier layer, or other analogous layer. Although depicted as a GMR or TMR sensor, in other embodiments, other structures and other sensing mechanisms may be used for the sensor. Also shown in FIG. 3B is are the tracks 109-1, 109-2 and 109-3 for the media 101.

The read sensors 112 and 114 may have different widths in the track width, or cross-track, direction. However, in other embodiments, other widths are possible. The widths of the sensors 112, 114 and 116 may also be based on the track pitch, tp. The track pitch is the distance from the center of one track to the center of the next track. Further, the widths may depend not only on the track pitch, but also on the distance between the sensors 112 and 114.

The read sensors 112 and 114 may also be self-aligned. Therefore, the centers of each of the read sensors 112 and 114 are aligned along a line that runs the down track direction. Stated differently, the centers of the read sensors 112 and 114 are not separated in the cross-track direction. This is because fabrication of the transducer 110 ensures that the read sensors 112 and 114 are self-aligned.

The read sensors 112 and 114 are separated by distance d in a down track direction. The down track direction is perpendicular to the cross track direction for the transducer 110. The cross track direction and track width direction are the same. As can be seen in FIG. 3B, the slider may also be oriented at a skew angle, $\alpha$, with respect to the media down track direction. Stated differently, the down track direction for the transducer (the "down track direction" shown in FIGS. 3A and 3B) is at the skew angle with respect to the "media down track direction" at a particular region of the media 101. This region may be half-way between the center of the disk and the edge of the disk. In conventional transducers, the skew angle at this location may be zero. The read transducer 110 and slider 102 may also be mounted at a nonzero bonding angle with respect to the suspension (not shown). Because the slider is mounted at the bonding angle with respect to the suspension, the skew angle of the transducer 110 will be equal to the bonding angle where the suspension is aligned with the media down track direction. The skew angle at other locations corresponds to a combination of the bonding angle and the angle between the suspension and the media down track direction.

Also shown are bias structures 122 and 123 that magnetically bias the read sensors 112 and 114, respectively. The magnetic bias structure(s) 122 and/or 123 may be soft bias structures fabricated with soft magnetic material(s). In other embodiments, the magnetic bias structure(s) 122 and/or 123 may be hard magnetic bias structures. Other mechanisms for biasing the sensors 112, and 114 might also be used.

The read sensors 112 and 114 are separated by shield 130. The read sensors 112 and 114 and shield 130 are surrounded by read shields 120 and 150. Thus, as used herein, a shield may be considered to be an internal shield, which is interleaved with read sensors 112 and 114 and between the outer, read shields 120 and 150. The outermost shields for the read transducer 110 are termed read shields. In the embodiment shown in FIGS. 2, 3A and 3B, three read sensors 112 and 114 and one internal shield 130 are shown. However, in another embodiment, another number of read sensors and internal shields may be present. The shields/read shields 120, 130 and 150 generally include soft magnetic material. In some embodiments, one or more of the shields 120, 130 and 150 may include ferromagnetic layers that are antiferromagnetically coupled.

Current is driven perpendicular-to-plane for the sensors 112 and 114. Thus, current is driven through the sensor 112 between the shields 120 and 130. Similarly, current is driven through the sensor 114 between the shields 130 and 150. Thus, electrical connection is to be made to the shields 120, 130 and 150. However, different currents may be desired to be driven through the sensors 112 and 114. Similarly, the resistances of the sensors 112 and 114 may be desired to be separately sensed. For example, the sensors 112 and 114 may each be desired to be separately coupled to their own preamplifier (preamp). As a result, the sensors 112 and 114 are desired to be electrically isolated from each other. Consequently, the shield 130 may be configured to not only magnetically shield the sensors 112 and 114, but also to provide electrical isolation. As a result, the shield 130 may include magnetic metallic layers separated by one or more insulating layers. Thus, the shield 130 includes conductive magnetic layers 132 and 136 that are separated by insulating layer 134. However, in other embodiments, the shield 130 may be a monolithic structure. Consequently, the separation between layers 132, 134 and 136 are shown as dotted lines The read transducer 110 may be used in higher density recording, such as TDMR. Through the placement of the sensors 112 and 114, the transducer 110 may address skew issues that might otherwise adversely affect performance of the transducer 110. In particular, the distance separating the read sensors 112 and 114 in the down track direction is such that the when the transducer 110 is at the skew angle, $\alpha$, the read sensors 112 and 114 are substantially centered on adjoining tracks. Thus, the distance between the sensors 112 and 114 is set such that the track pitch (tp) divided by the distance (d) is the cosine of the skew angle. Stated differently, $d = (tp)/\cos \alpha$. The skew angle $\alpha$ occurs when the transducer 110 is situated substantially half way between the edge of the disk and the center of the disk. However, in other embodiments, other angles may be possible. Because the distance between the sensors 112 and 114 are set such that the sensors 112 and 114 are on adjoining tracks, TDMR, including accounting for noise, can be better performed. Performance of the transducer 110 may thus be improved.

Figure 4:
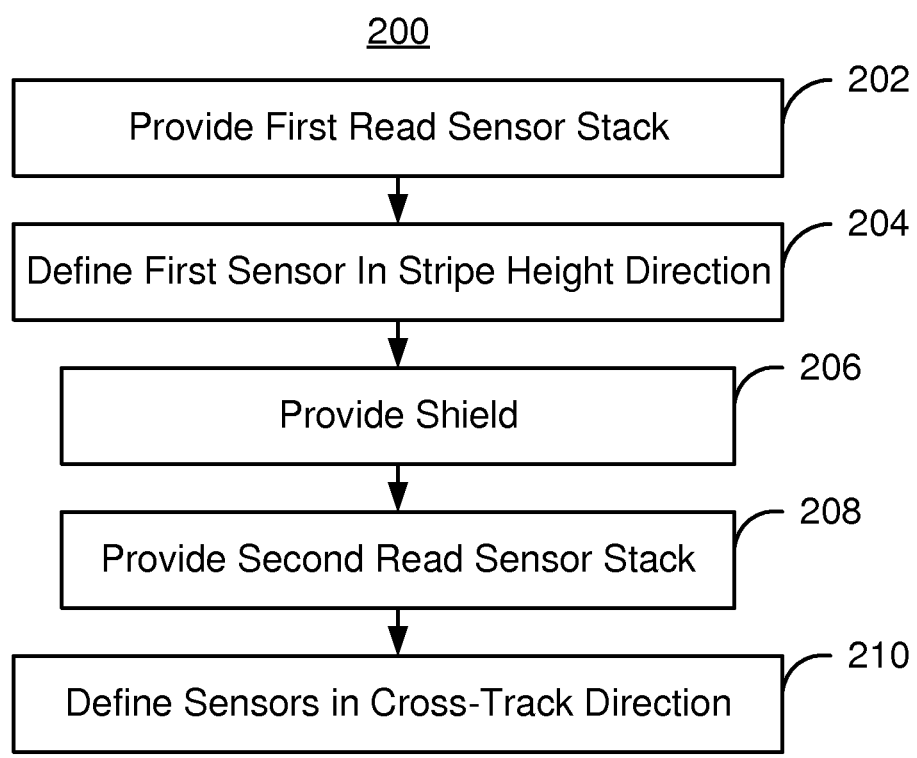
FIG. 4 is a flow chart depicting an exemplary embodiment of a method for fabricating a magnetic recording read transducer.

FIG. 4 is an exemplary embodiment of a method 200 for providing a read transducer having self-aligned read sensors and which may address skew issues. For simplicity, some steps may be omitted, interleaved, and/or combined. The method 200 is also described in the context of providing a single recording transducer 110 depicted in FIGS. 2, 3A and 3B. However, the method 200 may be used to fabricate multiple transducers at substantially the same time. The method 200 may also be used to fabricate other transducers. The method 200 is also described in the context of particular layers. A particular layer may include multiple materials and/or multiple sub-layers. The method 200 also may start after formation of other portions of the magnetic recording transducer.

The first read sensor stack for the read sensor 114 is provided, via step 202. Step 202 may include full-film depositing an AFM layer, a pinned layer, a nonmagnetic spacer (e.g. tunneling barrier) layer and a free layer. The read sensor 112 is defined in the strip height direction, via step 204. The stripe height direction is perpendicular to the ABS. Step 204 may include covering a portion of the first read sensor stack near the ABS and ion milling the exposed portion of the read sensor stack. The shield 130 is provided on the first read sensor stack, via step 206. Step 206 may include depositing the shield layers 132 and 136 as well as the insulating layer 134. The shield 130 resides in a down track direction from the first read sensor stack and, therefore, from the first read sensor 112.

A second read sensor stack is provided, via step 208. Step 208 includes full-film depositing the layers for the read sensor 114 on the shield 130. The shield is thus between the first read sensor and the second read sensor stack in the down track direction. The shield 130 and intervening layer(s) may also be configured such that the distance between the first read sensor 112 and the second read sensor 112 is the track pitch divided by the cosine of the skew angle at a particular location. This distance may be considered to be the distance between the leading edges of the sensor layers 113 and 115.

Both the first read sensor 112 and the second read sensor 114 are defined in the cross-track direction, via step 210. The first read sensor 112 is defined from the first read sensor stack. The second read sensor 114 is defined from the second read sensor stack in the cross-track direction. These sensors 112 and 114 are defined together. Thus, the first read sensor 112 and the second read sensor 114 are self-aligned in the cross-track direction. As such, the centers of the sensors 112 and 114 are substantially aligned.

Fabrication of the transducer 110 may then continue. For example, the second read sensor 114 may be defined in the stripe height direction. Magnetic bias structures 122 and 123 may also be provided. These magnetic bias structures 122 and 123 may also be electrically insulated from the read sensors 112 and 114.

Using the method 200, the self-aligned read sensors 112 and 114 may be fabricated. Consequently, overlay issues may be mitigated or avoided. In addition, the desired distance between the read sensors 112 and 114 may be provided. Thus, the transducer 110 may perform as desired at skew. Thus, the benefits of the magnetic transducer 110 may be achieved.

Figure 5:
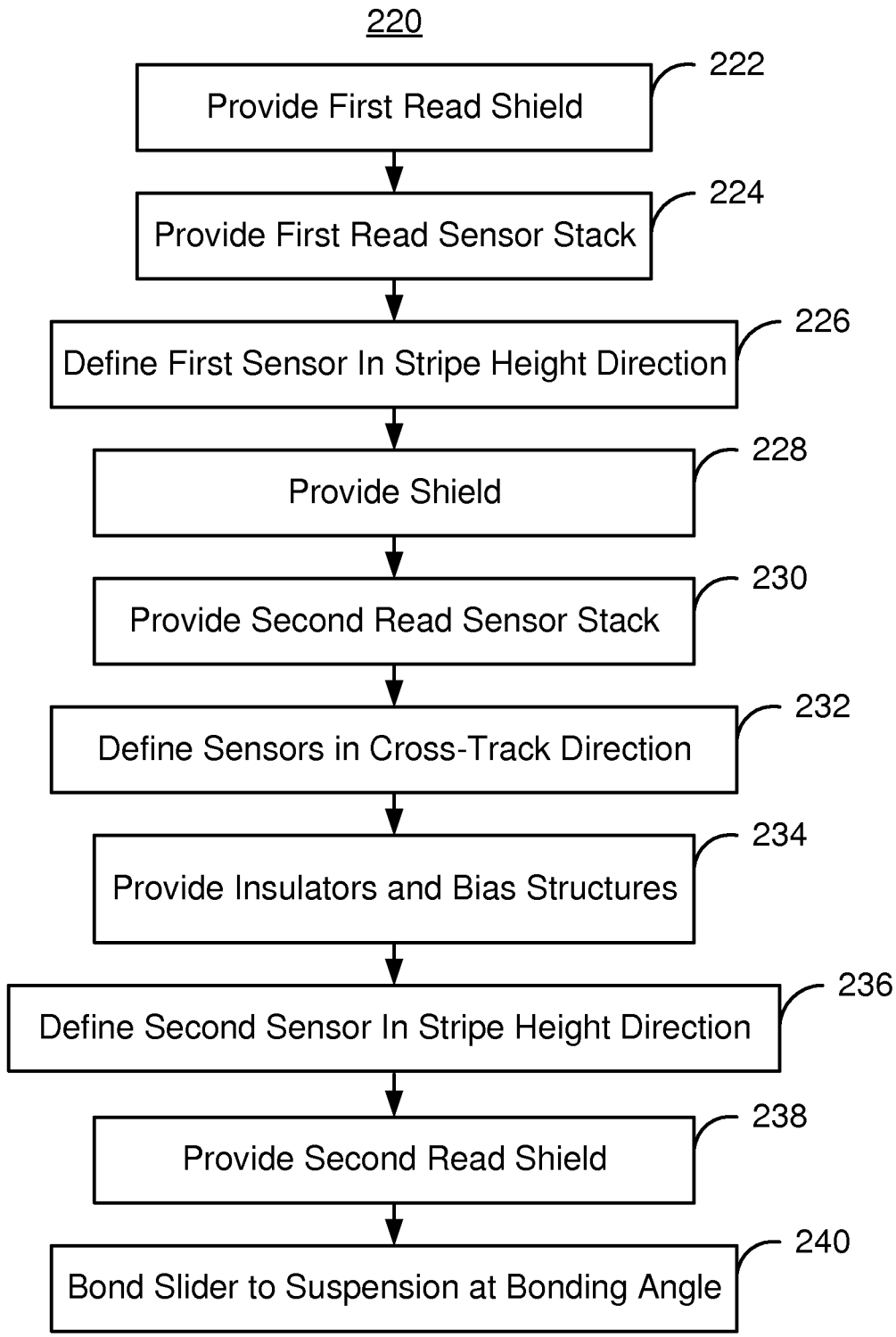
FIG. 5 is a flow chart depicting another exemplary embodiment of a method for fabricating a disk drive including a magnetic recording read transducer.

FIG. 5 is an exemplary embodiment of a method 220 for providing a disk drive including a read transducer having self-aligned read sensors and which may address skew issues for TDMR. For simplicity, some steps may be omitted, interleaved, and/or combined. The method 220 is also described in the context of providing a single recording transducer 110 depicted in FIGS. 2, 3A and 3B. However, the method 220 may be used to fabricate multiple transducers at substantially the same time. The method 220 may also be used to fabricate other transducers. The method 220 is also described in the context of particular layers. A particular layer may include multiple materials and/or multiple sub-layers. The method 220 also may start after formation of other portions of the magnetic recording transducer.

The first read shield 120 is provided, via step 222. Step 222 typically includes depositing (e.g. plating) a large high permeability layer. The first read sensor stack for the read sensor 114 is provided, via step 224. Step 224 may include full-film depositing an AFM layer, a pinned layer, a nonmagnetic spacer (e.g. tunneling barrier) layer and a free layer 113. The read sensor 112 is defined in the strip height direction, via step 226. The stripe height direction is perpendicular to the ABS. Step 226 may include covering a portion of the first read sensor stack near the ABS and ion milling the exposed portion of the read sensor stack. In some embodiments, all layers of the read sensor stack are milled through in step 226. In other embodiments, the pinned layer may be an extended pinned layer. Thus, the milling may stop before the pinned layer is milled through. In some embodiments, the pinned layer may be separately milled to have a second, desired stripe height greater than the stripe height of the free layer 113.

The shield 130 is provided on the first read sensor stack, via step 228. Step 228 may include depositing the shield layers 132 and 136 as well as the insulating layer 134. The shield 130 resides in a down track direction from the first read sensor stack and, therefore, from the first read sensor 112.

A second read sensor stack is provided, via step 230. Step 230 includes full-film depositing the layers for the read sensor 114 on the shield 130. The shield is thus between the first read sensor and the second read sensor stack in the down track direction. The shield 130 and intervening layer(s) may also be configured such that the distance between the first read sensor 112 and the second read sensor 112 is the track pitch divided by the cosine of the skew angle. This distance may be considered to be the distance between the leading edges of the sensor layers 113 and 115.

Both the first read sensor 112 and the second read sensor 114 are defined in the cross-track direction, via step 232. The first read sensor 112 is defined from the first read sensor stack. The second read sensor 114 is defined from the second read sensor stack in the cross-track direction. These sensors 112 and 114 are defined together. Thus, the first read sensor 112 and the second read sensor 114 are self-aligned in the cross-track direction. As such, the centers of the sensors 112 and 114 are substantially aligned. Step 232 may include ion milling the first and second sensor stacks as well as the shield. The ion mill may extend down to the first read shield 120.

Insulators and bias structures are then provided, via step 234. Insulators are deposited to electrically insulate the first read sensor 112 from the magnetic bias structure 122 and to electrically insulate the second read sensor 114 from the magnetic bias structure 123. The magnetic bias structures 122 and 123 may also be provided. Thus, a first insulator is generally provided for the read sensor 112, followed by the magnetic bias structure 122. A second insulator is provided for the read sensor 114 after the magnetic bias structure 122 has been deposited. The magnetic bias structure 123 may then be formed.

The second read sensor 114 is defined in the stripe height direction, via step 236. The stripe height of the second read sensor 114 may be the same as or different from the stripe height of the first read sensor 112. In some embodiments, all layers of the second read sensor stack are milled through in step 236. In other embodiments, the pinned layer may be an extended pinned layer. Thus, the milling may stop before the pinned layer is milled through. In some embodiments, the pinned layer may be separately milled to have a second, desired stripe height greater than the stripe height of the free layer 115.

The second read shield is provided, via step 238. Step 238 typically includes depositing (e.g. plating) a large high permeability layer. Fabrication of the transducer and disk drive may then be completed. For example, fabrication of other components such as leads and contacts may be performed. Lapping, separation of a wafer into individual sliders and/or other processes may be performed.

The slider 102 is mounted to the suspension at a bonding angle, via step 240. Thus, the slider 102 may be mounted to allow for the skew angle α to be achieved in the desired location of the media 101.

Using the method 220, the self-aligned read sensors 112 and 114 may be fabricated. Consequently, overlay issues may be mitigated or removed. In addition, the desired distance between the read sensors 112 and 114 may be provided. Thus, the transducer 110 may perform as desired at skew. Thus, the benefits of the magnetic transducer 110 may be achieved.

Figure 6:
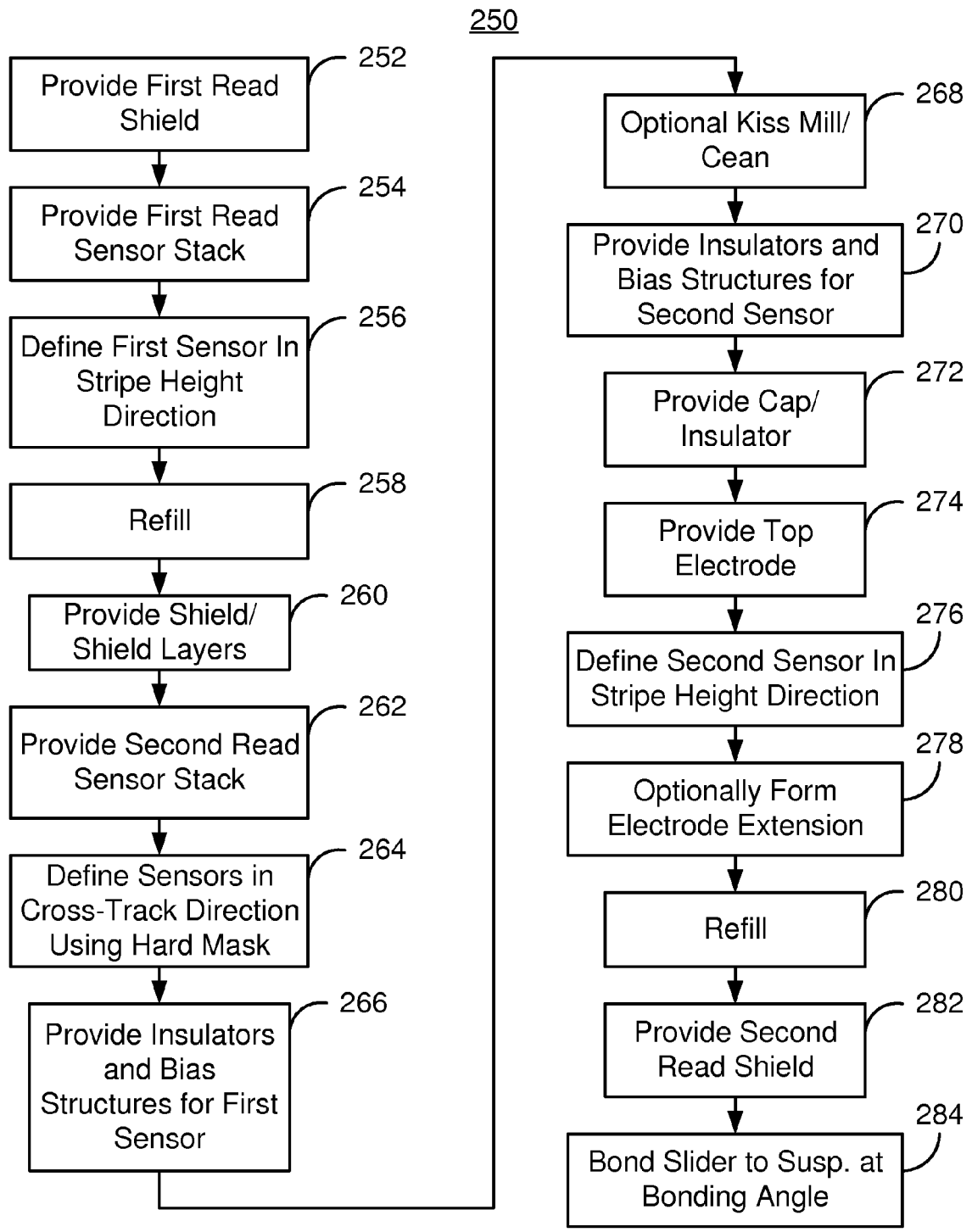
FIG. 6 is a flow chart depicting another exemplary embodiment of a method for fabricating a disk drive including a magnetic recording read transducer.

FIG. 6 is an exemplary embodiment of a method 250 for providing a disk drive including read transducer having self-aligned sensors usable in TDMR. For simplicity, some steps may be omitted, interleaved, and/or combined. FIGS. 7-18 depict exemplary embodiments of a magnetic disk drive 300 during fabrication using the method 250. For clarity, FIGS. 7-18 are not to scale and not all portions of the disk drive 300 are shown. The method 250 is described in the context of providing a single disk drive 300 depicted in FIGS. 7-18. However, the method 250 may be used to fabricate multiple transducers at substantially the same time. The method 250 may also be used to fabricate other disk drive including but not limited to the disk drive 100. The method 250 is also described in the context of particular layers. A particular layer may include multiple materials and/or multiple sub-layers. The method 250 also may start after formation of other portions of the magnetic recording transducer.

The first read shield is provided, via step 252. Step 252 typically includes depositing (e.g. plating) a large high permeability layer. The first read sensor stack for the read sensor is provided, via step 254. Step 254 may include full-film depositing the layers for the first read sensor. FIG. 7 depicts an ABS view of the disk drive 300 after step 254 has been performed. A first read shield 302 formed in step 252 is depicted. Also shown is the read sensor stack 310. The read sensor stack includes a pinning layer 306 that may be an AFM layer, a pinned layer 310, a nonmagnetic spacer that is a tunneling barrier layer 320 and a free layer 325. In the embodiment shown, the pinned layer 310 may be a synthetic antiferromagnet (SAF) including ferromagnetic layers 312 and 316 separated by nonmagnetic spacer layer 314. In addition, a capping layer that may serve as a top electrode 308 has also been deposited.

The read sensor is defined in the strip height direction, via step 256. FIG. 8 depicts a side view of the disk drive 300 during step 256. Thus, the ion mill is shown by arrows. A mask 326 covering the portion of the read sensor stack near the ABS is also shown. In the embodiment shown, the mill proceeds through to the read shield 302. Thus, a remaining portions of layers 304', 306', 310' (including layers 312', 314' and 316'), 320', 325' and 308' form the remaining read sensor stack 330'. In other embodiments, the read sensor stack 330' may be configured differently.

Figure 9:
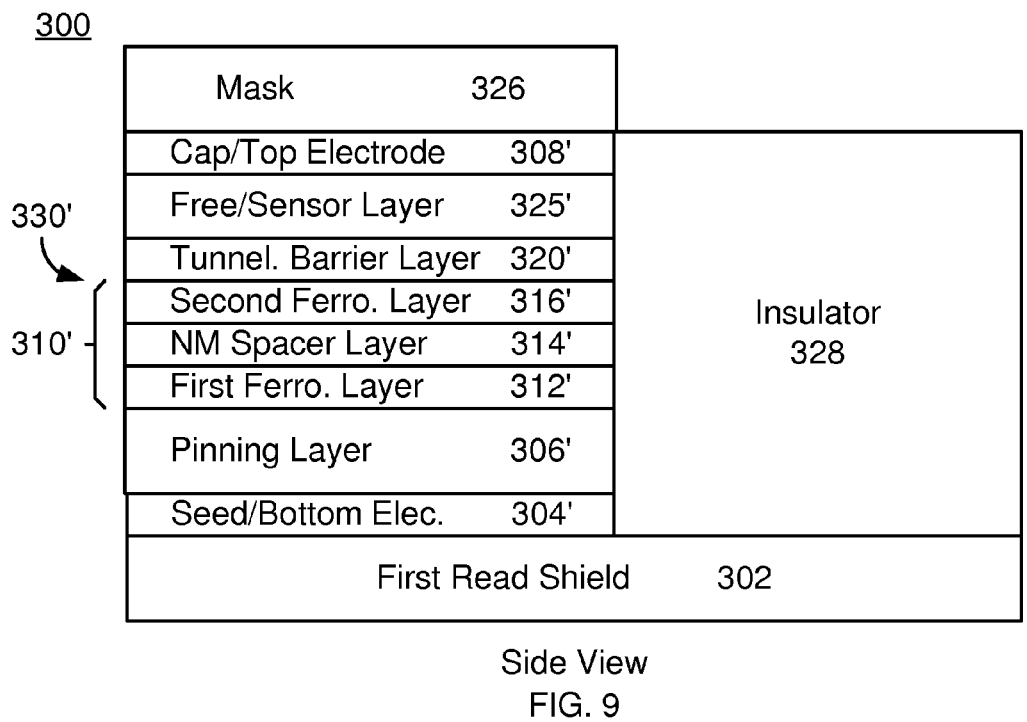

A refill is then performed, via step 258. Consequently, a refill material such as alumina may be deposited to fill in the region of the transducer from which the read sensor stack has been removed. FIG. 9 depicts a side view of the disk drive 300 after step 258 is performed. Thus, an insulator 328 has been deposited in the refill step. Although not shown, a portion of the insulator may reside on the mask 326.

Figure 10:
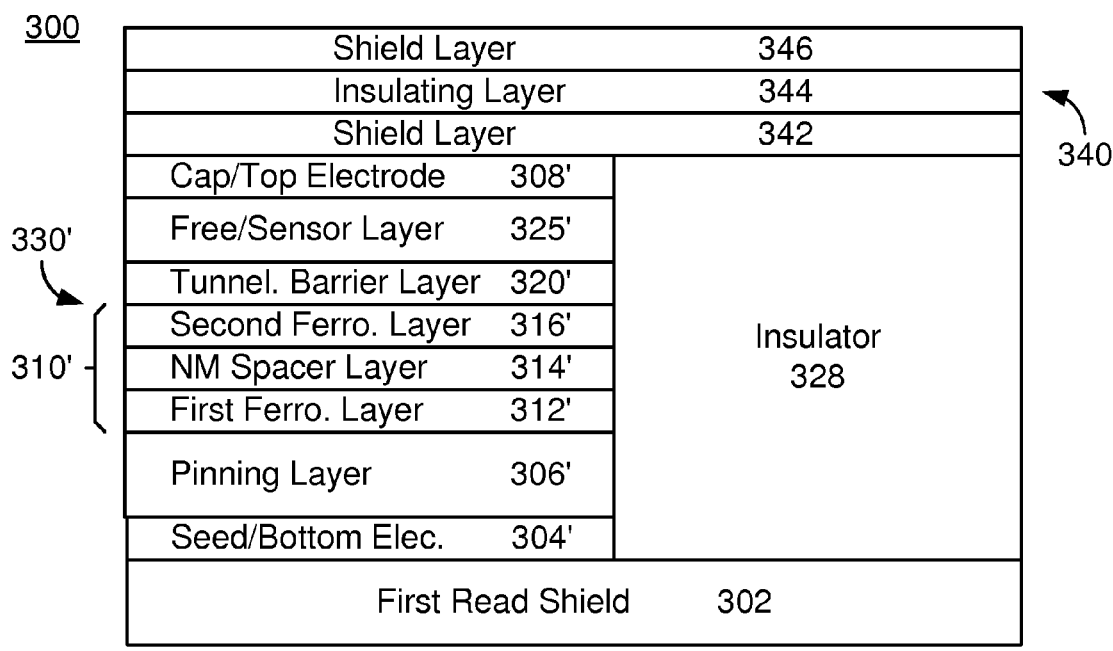

The layer(s) for the shield are provided on the first read sensor stack 330', via step 260. FIG. 10 depicts a side view of the transducer after step 260 is performed. Thus, shield layers 342 and 346 and insulating layer 344 have been deposited. The shield layers 342 and 346 may be conductive, high permeability layers. The layers 342, 344 and 346 may be considered to form shield 340.

A second read sensor stack is provided, via step 262. Step 262 includes full-film depositing the layers for the second read sensor on the shield 340. FIG. 11 depicts an ABS view of the transducer of the disk drive 300 after step 262 is performed. Thus, the read sensor stack 350 is shown. The read sensor stack 350 includes a seed/bottom electrode layer 354, a pinning/AFM layer 356, a pinned layer 360, a nonmagnetic spacer layer depicted as a tunneling barrier layer 370, a free layer 375 and a capping layer 358. In the embodiment shown, the pinned layer 360 may be a SAF including ferromagnetic layers 362 and 366 separated by nonmagnetic spacer layer 364. The shield 340 is between the first read sensor stack 330' and the second read sensor stack 350 in the down track direction. The shield 340 and intervening layer(s) such as the capping/electrode layer 308' may also be configured such that the distance between the first read sensor and the second read sensor is the track pitch divided by the cosine of the skew angle. This distance may be considered to be the distance between the leading edges of the sensor layers 325 and 375.

Figure 12:
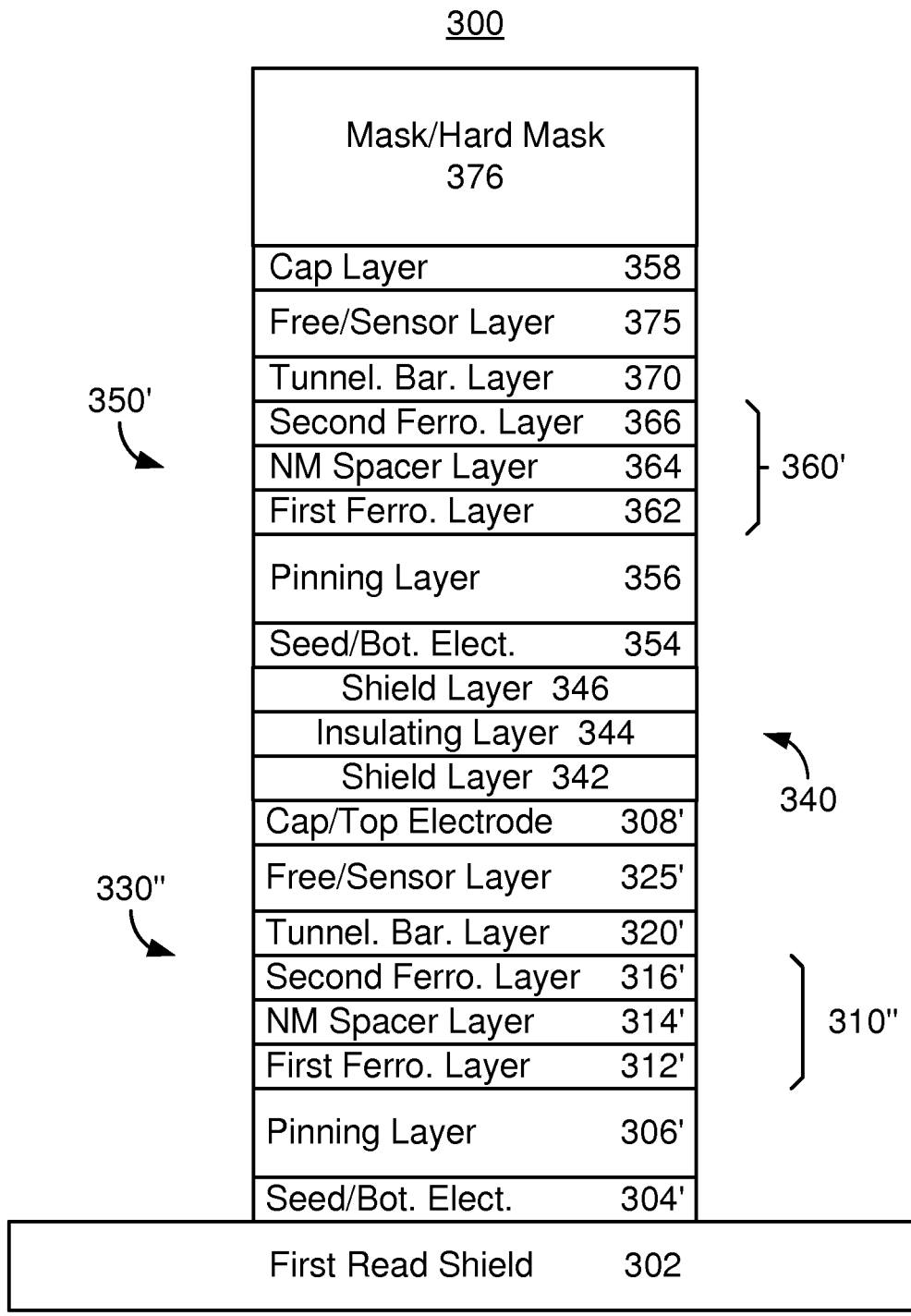

Both the first read sensor and the second read sensor are defined form the first read sensor stack 330' and the second read sensor stack 350, respectively, in the cross-track direction, via step 264. FIG. 12 depicts an ABS view of the transducer for the disk drive 300 after step 264 is performed. Also shown is a mask 376 used in step 264. The first read sensor 330" is defined from the first read sensor stack in the cross-track direction. Fabrication of the read sensor 330" is thus completed. The second read sensor 350' is defined from the second read sensor stack in the cross-track direction. Although fabrication of the second read sensor is not completed, the track width has been defined. These read sensors 330" and 350' are defined in the cross-track direction together.

Figure 13:
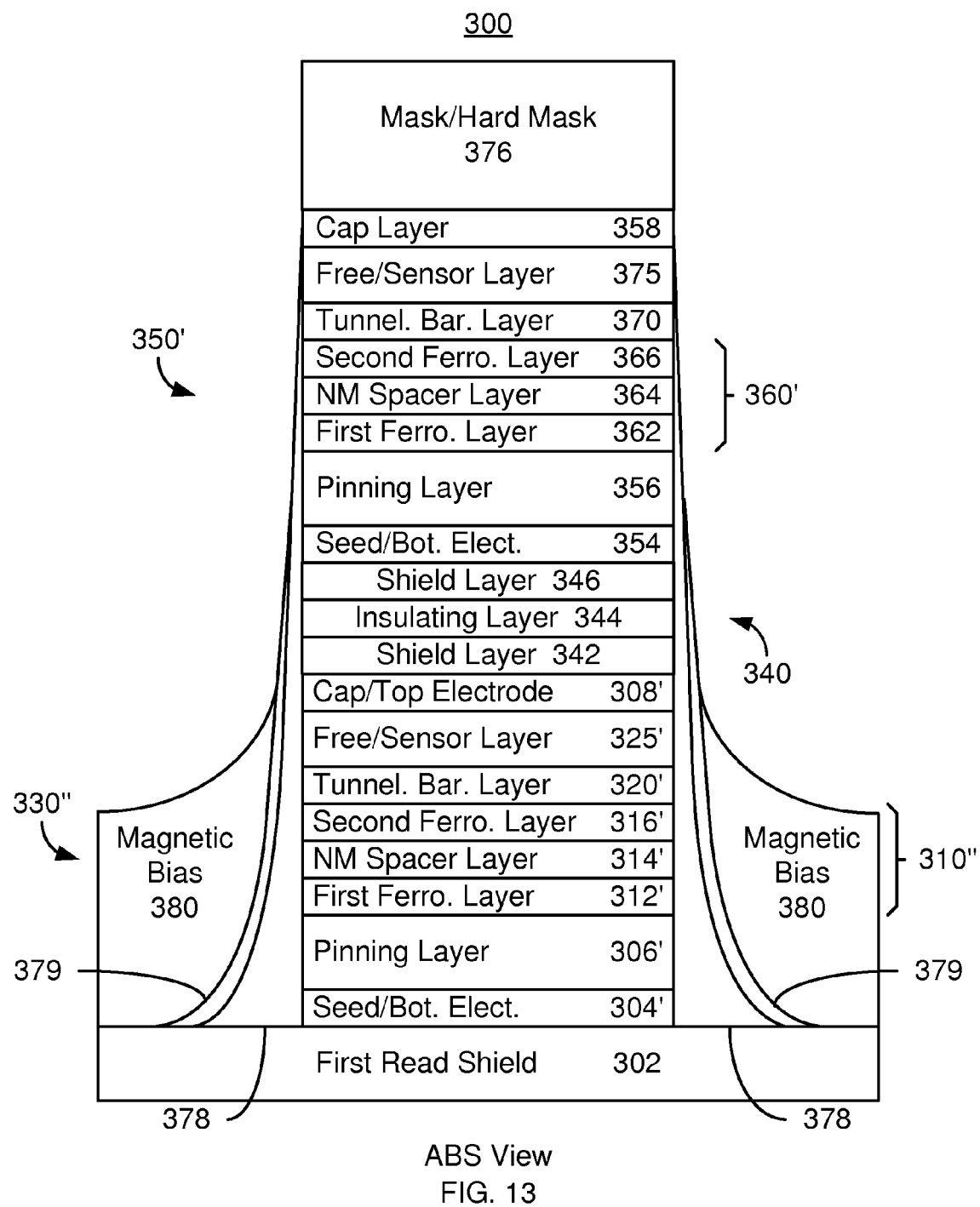

The insulators and bias structures for the first read sensor 330" are then provided, via step 266. FIG. 13 depicts an ABS view of the transducer of the disk drive 300 after step 266 is performed. Thus, a first insulating layer 378, a seed layer 379 and the magnetic bias structure 380 are shown. In some embodiments, the first insulating layer 378 may be diamond-like carbon (DLC). The magnetic bias structures 380 may be soft or hard bias structures. A light, or kiss, milling may optionally be performed, via step 268. Thus, the surface may be cleaned.

Figure 14:
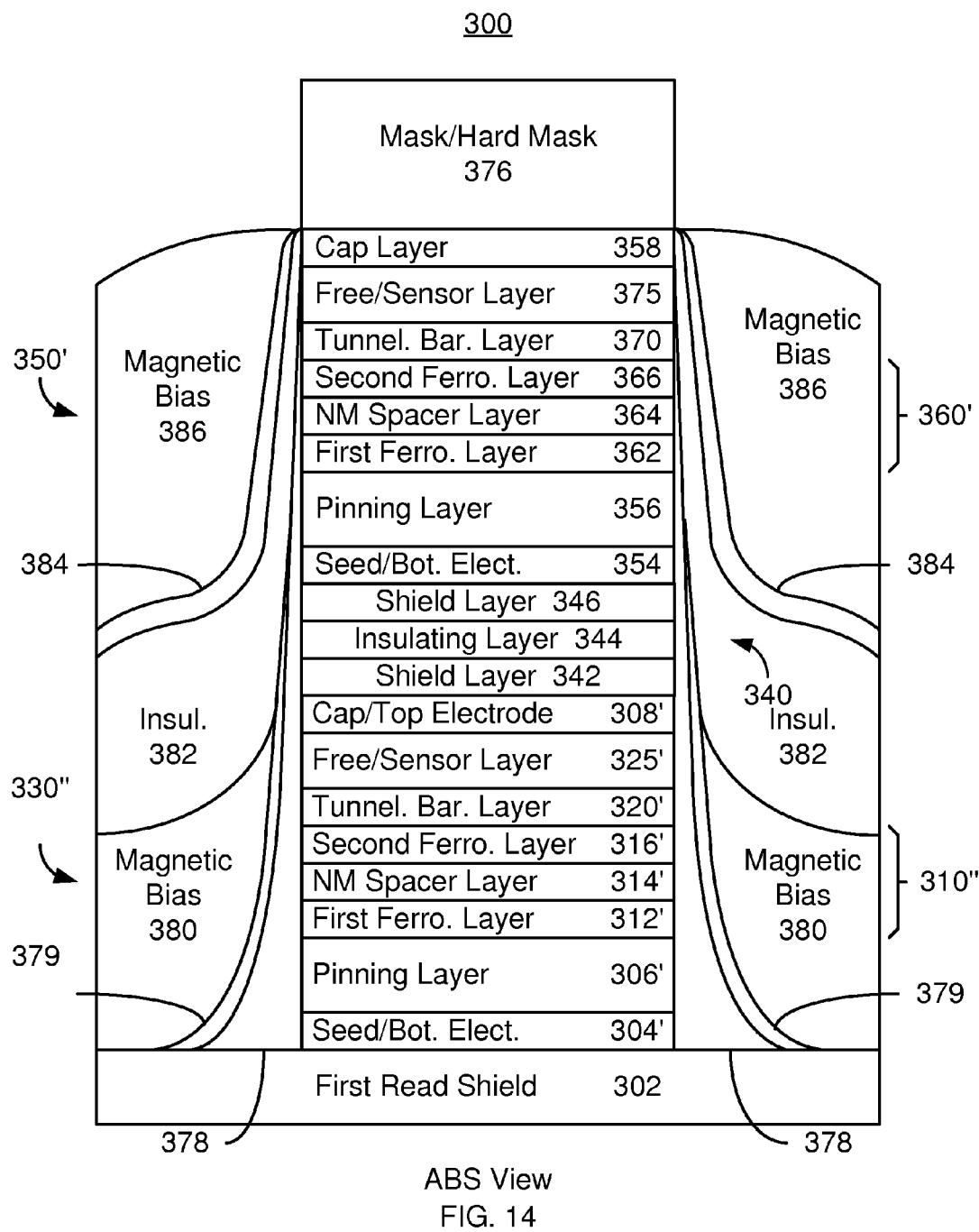

The insulators and bias structures for the second read sensor 350' are then provided, via step 270. FIG. 14 depicts an ABS view of the transducer of the disk drive 300 after step 270 is performed. Thus, a second insulating layer 382, a seed layer 384 and the magnetic bias structure 386 are shown. In some embodiments, the second insulating layer 382 may be DLC. The magnetic bias structures 386 may be soft or hard bias structures.

Figure 15:
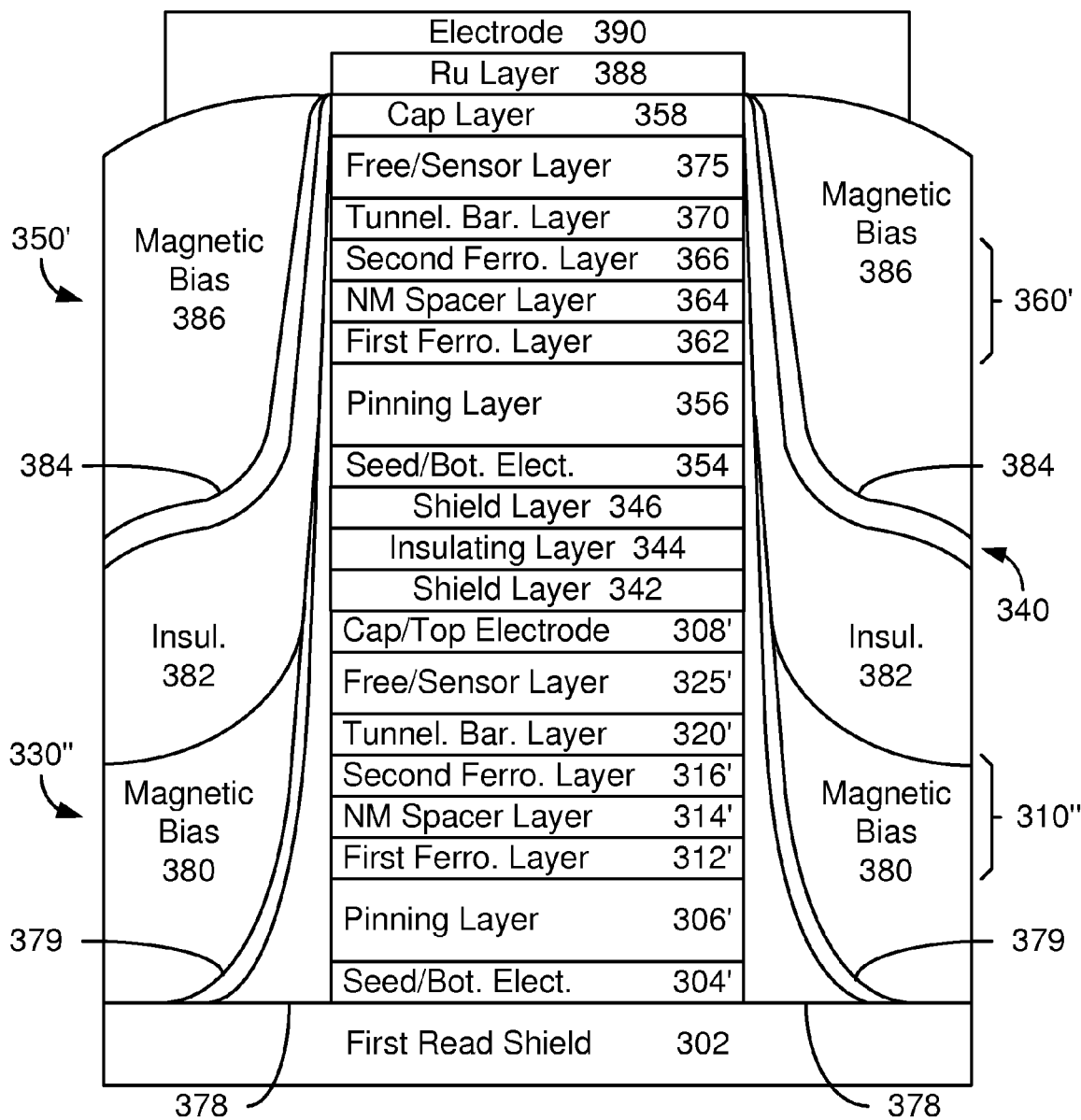

The capping layer may then be provided, via step 274. In addition, a top electrode may be provided, via step 276. FIG. 15 depicts an ABS view of the transducer for the disk drive 300 after step 274 is performed. Thus, the mask 376 has been removed. In addition, a Ru layer 388 and an electrode 390 are shown.

Figure 16:
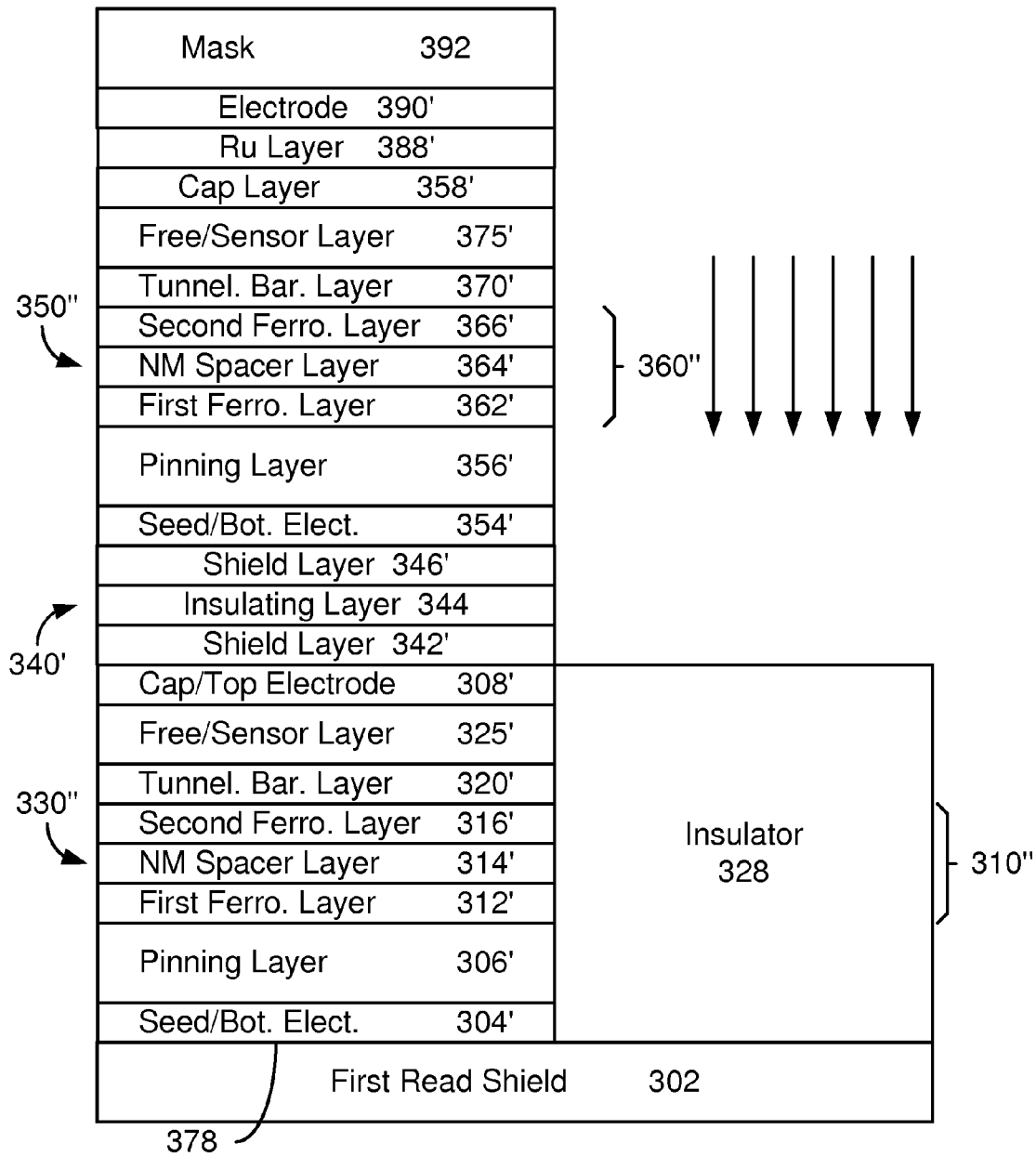

The second read sensor is defined in the stripe height direction, via step 276. FIG. 16 depicts a side view of the transducer of the disk drive 100 during step 276. Step 276 is performed using an ion mill, shown by arrows in FIG. 16. The second sensor 350" is also shown. In the embodiment shown, the stripe height of the second read sensor 350" is the same as the stripe height of the first read sensor 330". However, in other embodiments, the stripe heights may differ. Further, the pinned layer 260" has the same stripe height as the free layer 375'. However, in other embodiments, the pinned layer 260" may have a different stripe height from the free layer 375'.

Electrode extensions may optionally formed, via step 278. The electrode extensions may be used to provide contact to the top of the read sensor 330" and the bottom of the second read sensor 350". A refill is performed, via step 280. Consequently, a refill material such as alumina may be deposited to fill in the region of the transducer from which the read sensor stack has been removed.

Figure 17:
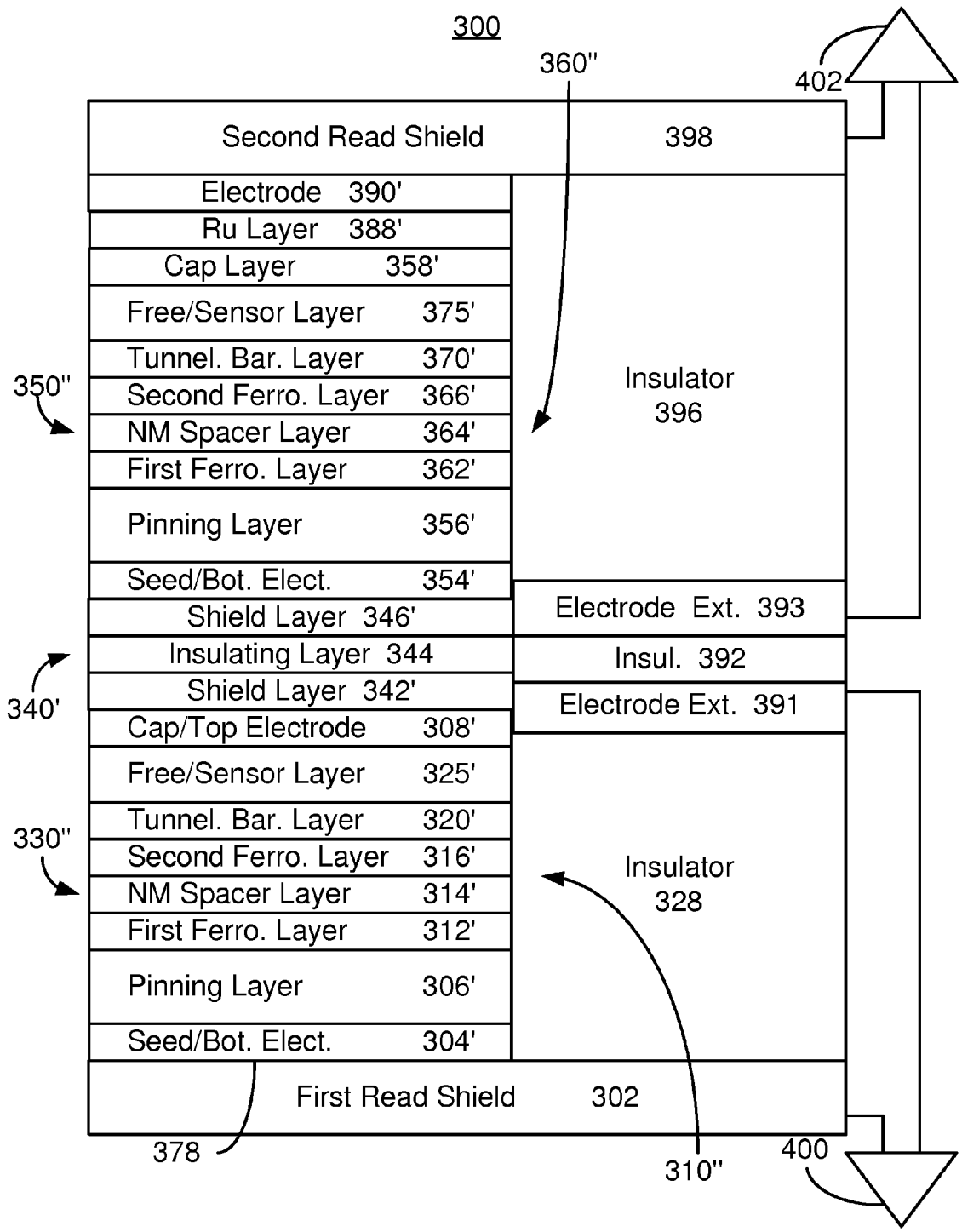

The second read shield is provided, via step 282. Step 282 typically includes depositing (e.g. plating) a large high permeability layer. Fabrication of the transducer may then be completed. The electronics such as preamplifiers for the read sensors may be provided. FIG. 17 depicts a side view of the read transducer of the disk drive 300. Insulator 392 and electrode extensions 391 and 393 are thus shown. Insulator 396 provided in the refill step 280 is also shown. Preamplifiers 400 and 402 for the sensors 330" and 350", respectively, are also shown. The second read shield 398 is also depicted.

Figure 18:
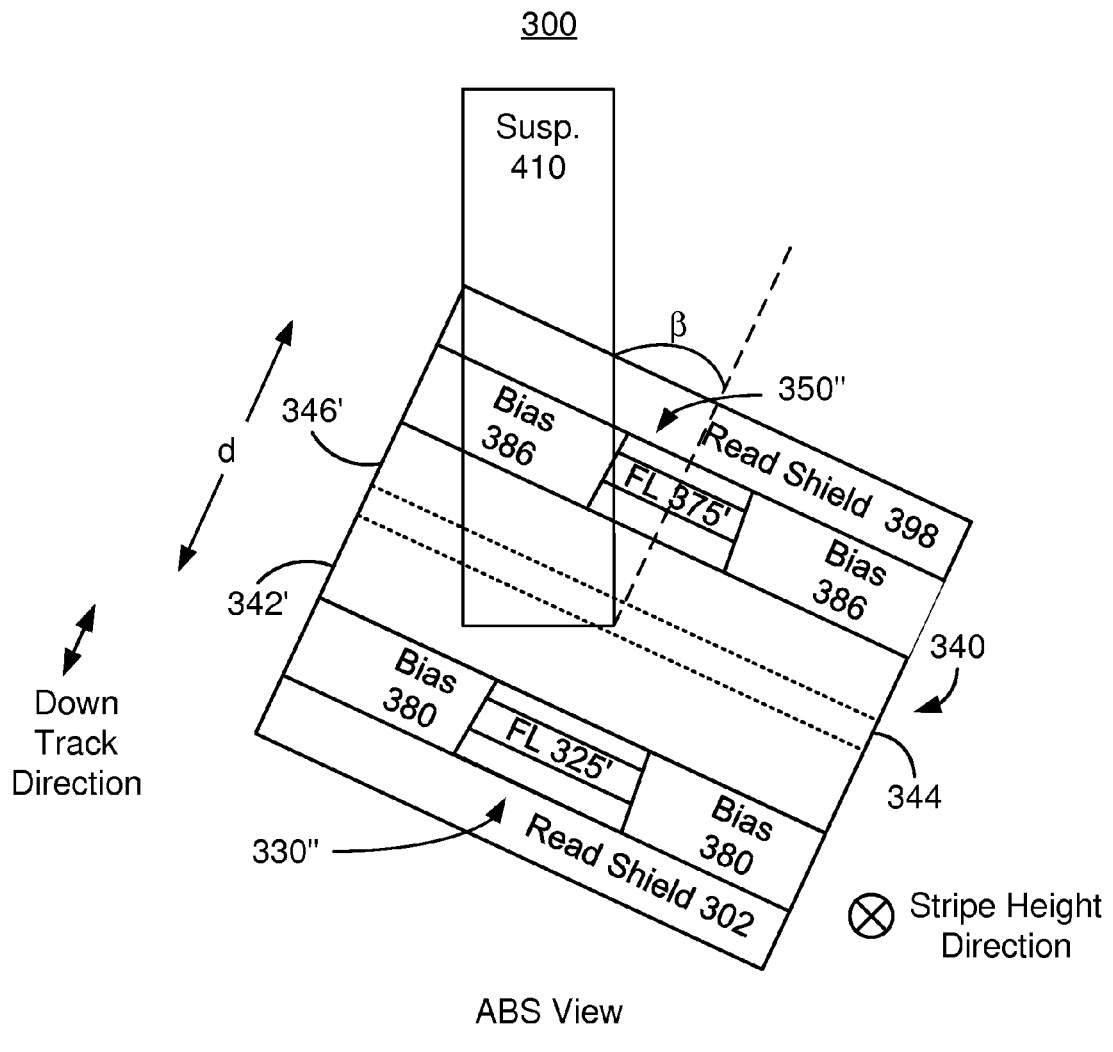

After fabrication of the transducer is completed and the wafer has been separated into individual sliders, the slider is mounted to the suspension at a bonding angle, via step 284. Thus, the slider may be mounted to allow for the skew angle to be achieved in the desired location of the media 101. FIG. 18 depicts the transducer of the disk drive 300 after step 284 is performed. Thus, the slider has been attached to the suspension 410 at a bonding angle, β. As a result, the read sensors 330" and 350" are at the desired skew angle. However, in other embodiments, other bonding angles, including a bonding angle of zero degrees, may be used.

Using the method 250, the self-aligned read sensors 330" and 350" may be fabricated. Overlay issues during fabrication may be reduced or eliminated. In addition, the desired distance between the read sensors 330" and 350" may be provided. Thus, the transducer may perform as desired at skew. Thus, the benefits of the magnetic disk drive 300 may be achieved.

We claim:

1. A method for providing a magnetic recording device, the method comprising:
   providing a media including a plurality of tracks having a track pitch; and
   providing a magnetic read transducer having an air bearing surface (ABS), the step of
   providing the magnetic read transducer including:
      providing a first read sensor stack;
      defining a first read sensor in a stripe height direction from the first read sensor stack, the stripe height direction being perpendicular to the ABS;
      providing a shield on the first read sensor stack and residing in a down track direction from the first read sensor stack;
      providing a second read sensor stack, the shield residing between the first read sensor and the second read sensor stack in the down track direction; and
      defining both the first read sensor from the first read sensor stack and a second read sensor from the second read sensor stack in a cross-track direction, the cross-track direction being substantially perpendicular to the down track direction and substantially perpendicular to the stripe height direction, the first sensor and the second sensor configured to read a portion of the plurality of tracks at a skew angle of greater than zero degrees; wherein a distance between the first read sensor and the second read sensor in the down track direction is configured such that the track pitch divided by the distance is substantially equal to the cosine of the skew angle.

2. The method of claim 1 wherein the step of providing the magnetic read transducer further includes:
   defining the second read sensor from the second read sensor stack in the stripe height direction.

3. The method of claim 1 wherein the step of providing the shield further includes:
   providing a first shield layer, the first shield layer being conductive;
   providing an insulating layer; and
   providing a second shield layer, the insulating layer being between the first shield layer and the second shield layer, the second shield layer being conductive, the first shield layer residing between the first read sensor and the second shield layer, the second shield layer being between the second read sensor and the first shield layer.

4. The method of claim 1 wherein the step of providing the magnetic read transducer further includes:
   providing an insulating layer on the first read sensor and the second read sensor.

5. The method of claim 4 wherein the step of providing the magnetic read transducer further includes:
   providing a magnetic bias structure for the first read sensor, the insulating layer residing between the magnetic bias structure and the first read sensor.

6. The method of claim 5 wherein the step of providing the magnetic read transducer further includes:
   providing an additional insulating layer on the second read sensor and the magnetic bias structure.

7. The method of claim 6 wherein the step of providing the magnetic read transducer further includes:
   providing an additional magnetic bias structure for the second read sensor, the additional insulating layer residing between the additional magnetic bias structure and the second read sensor and between the magnetic bias structure and the additional magnetic bias structure.

8. The method of claim 1 wherein the first read sensor includes a first sensor layer, the second read sensor includes a second sensor layer and wherein the distance is between a leading edge of the first read sensor and a leading edge of the second read sensor.

9. The method of claim 1 wherein the step of providing the magnetic read transducer further includes:
   providing a first read shield; and
   providing a second read shield, the first read sensor, the shield and the second read sensor being between the first read shield and the second read shield.

10. A method for providing a disk drive including a magnetic read transducer on a slider having an air-bearing surface (ABS), the method comprising:
   providing a media including a plurality of tracks having a track pitch; and
   providing the magnetic read transducer, the step of providing the magnetic read transducer including:
      providing a first read shield;
      providing a first read sensor stack on the first read shield, the first read sensor stack including a first seed layer, a first pinning layer on the first seed layer, a first pinned layer on the first pinning layer, a first tunneling barrier layer on the first pinned layer, a first sensor layer on the first tunneling barrier layer and at least one of a first capping layer and a first electrode layer on the first sensor layer;
      defining a first read sensor in a stripe height direction from the first read sensor stack, the stripe height direction being perpendicular to the ABS, the step of defining the first read sensor including performing a first ion mill;
      providing a first insulating layer, the first read sensor residing between the first insulating layer and the ABS;
      providing a shield on the first read sensor stack and residing in a down track direction from the first read sensor stack;
      providing a second read sensor stack, the shield residing between the first read sensor and the second read sensor stack in the down track direction, the second read sensor stack including a second seed layer, a second pinning layer on the second seed layer, a second pinned layer on the second pinning layer, a second tunneling barrier layer on the second pinned layer, a second sensor layer on the second tunneling barrier layer and at least one of a second capping layer and a second electrode layer on the second sensor layer, the first sensor layer and the second sensor layer configured to read a portion of the plurality of tracks at a skew angle of greater than zero degrees, the second sensor layer being a distance in the down track direction from the first sensor layer, the track pitch divided by the distance being substantially equal to a cosine of the skew angle;

defining both the first read sensor from the first read sensor stack and a second read sensor from the second read sensor stack in a cross-track direction using a hard mask, the cross-track direction being substantially perpendicular to the down track direction and substantially perpendicular to the stripe height direction, the step of defining the first and the second read sensor including performing a second ion mill;

providing a first magnetic bias structure for the first read sensor, the first insulating layer residing between the first magnetic bias structure and the first read sensor;

providing a second insulating layer on the second read sensor and the first magnetic bias structure;

providing a second magnetic bias structure for the second read sensor, the second insulating layer residing between the second magnetic bias structure and the second read sensor and between the first magnetic bias structure and the second magnetic bias structure;

defining the second read sensor from the second read sensor stack in the stripe height direction;

providing a second read shield, the first read sensor, the shield and the second read sensor being between the first read shield and the second read shield; and bonding the slider including the read transducer to a suspension at a bonding angle corresponding to the skew angle.

11. A magnetic recording device comprising:
a media including a plurality of tracks having a track pitch; and
a magnetic read transducer having an air bearing surface and including
a first read sensor;
a shield residing in a down track direction from the first read sensor; and
a second read sensor, the shield residing between the first read sensor and the second read sensor in the down track direction, the first read sensor and the second read sensor being self-aligned, the magnetic read transducer being oriented with respect to the media such that the first sensor and the second sensor read a portion of the plurality of tracks at a skew angle of greater than zero degrees;
wherein a distance between the first read sensor and the second read sensor in the down track direction is configured such that the track pitch divided by the distance is substantially equal to the cosine of the skew angle.

12. The magnetic recording device of claim 11 wherein the magnetic read transducer further includes:
a first read shield; and
a second read shield, the first read sensor, the second read sensor and the shield residing between the first read shield and the second read shield.

13. The magnetic recording device of claim 11 wherein the shield further includes a first shield layer, an insulating layer and a second shield layer, the first shield layer and the second shield layer being conductive, the insulating layer being between the first shield layer and the second shield layer.

14. The magnetic recording device of claim 11 wherein the magnetic read transducer further includes:
an insulating layer on the first read sensor and the second read sensor.

15. The magnetic recording device of claim 14 wherein the magnetic read transducer further includes:
a magnetic bias structure for the first read sensor, the insulating layer residing between the magnetic bias structure and the first read sensor;
an additional insulating layer on the second read sensor and the magnetic bias structure; and
an additional magnetic bias structure for the second read sensor, the additional insulating layer residing between the additional magnetic bias structure and the second read sensor and between the magnetic bias structure and the additional magnetic bias structure.

16. The magnetic recording device of claim 11 wherein the first read sensor includes a first sensor layer, the second read sensor includes a second sensor layer and wherein the distance is between a leading edge of the first read sensor and a leading edge of the second read sensor.

17. The magnetic recording device of claim 11 wherein the first read sensor and the second read sensor are aligned in the down track direction to within five nanometers.

18. The magnetic recording device of claim 11 wherein the magnetic transducer is configured to be bonded to a suspension at a bonding angle corresponding to the skew angle.

19. A magnetic disk drive comprising:
a media including a plurality of tracks having a track pitch;
a slider;
a read transducer having an air-bearing surface (ABS), the magnetic read transducer including a first read sensor, a shield residing in a down track direction from the first read sensor, and a second read sensor, the shield residing between the first read sensor and the second read sensor in the down track direction, the first read sensor and the second read sensor being self-aligned, the magnetic read transducer being configured for a skew angle, and wherein a distance between the first read sensor and the second read sensor is configured such that the track pitch divided by the distance is substantially equal to the cosine of the skew angle; and
a suspension, the slider being bonded to the suspension at a bonding angle corresponding to the skew angle.

* * * * *